June 10, 1930. F. C. KRUEGER 1,762,443
CANNING MACHINE
Filed Sept. 20, 1924 6 Sheets-Sheet 2

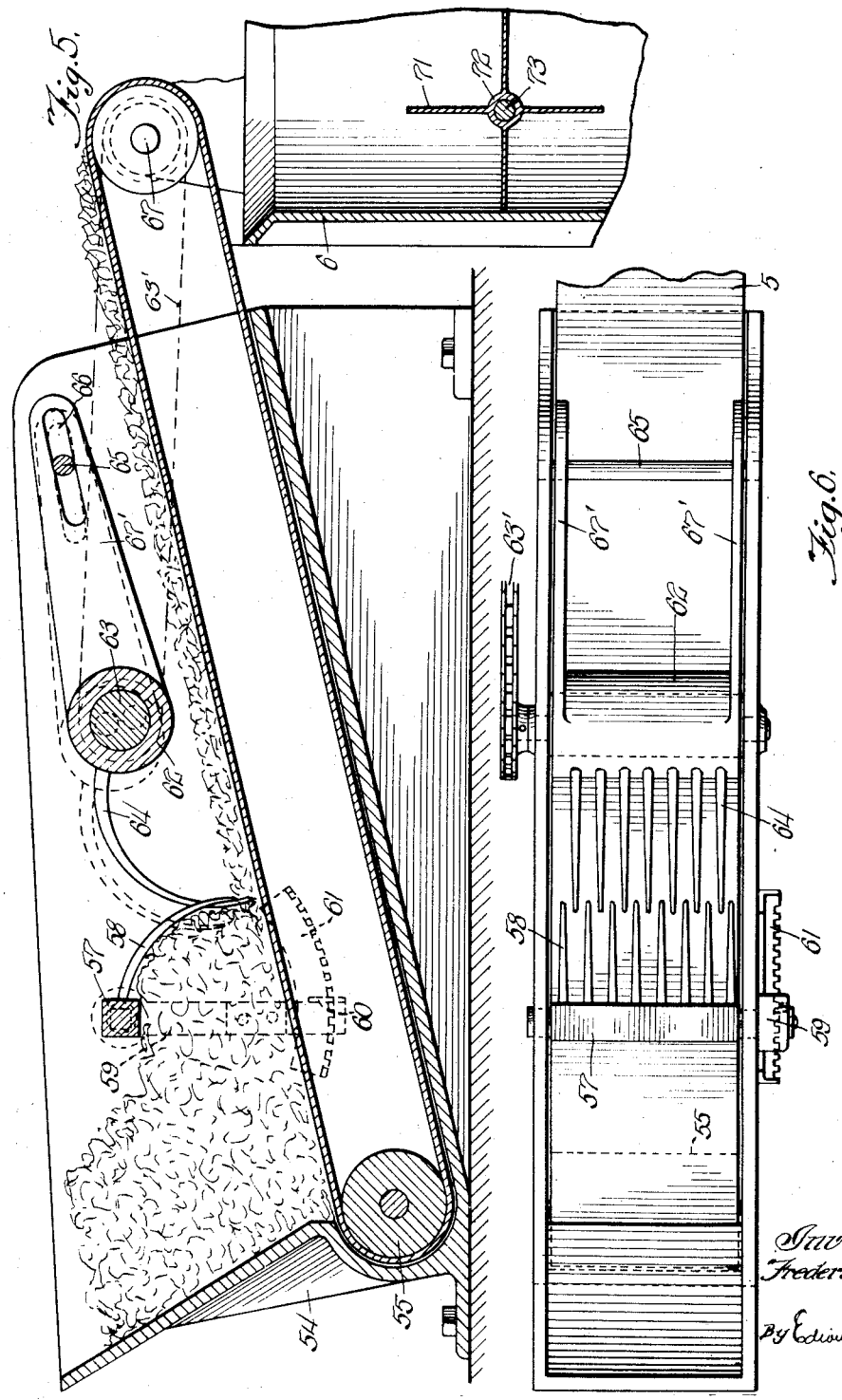

June 10, 1930. F. C. KRUEGER 1,762,443
CANNING MACHINE
Filed Sept. 20, 1924     6 Sheets-Sheet 6
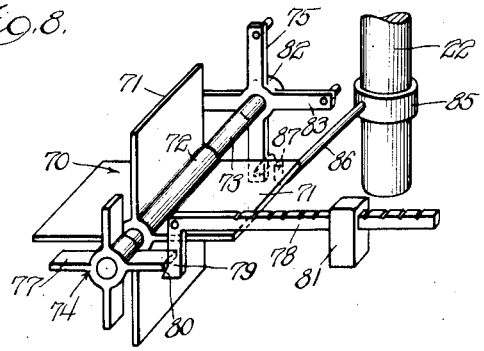
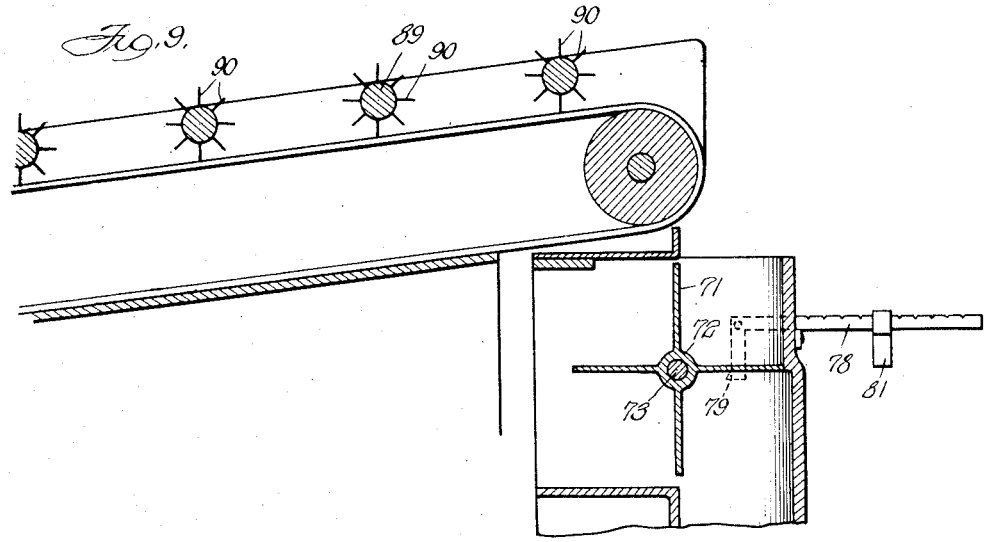
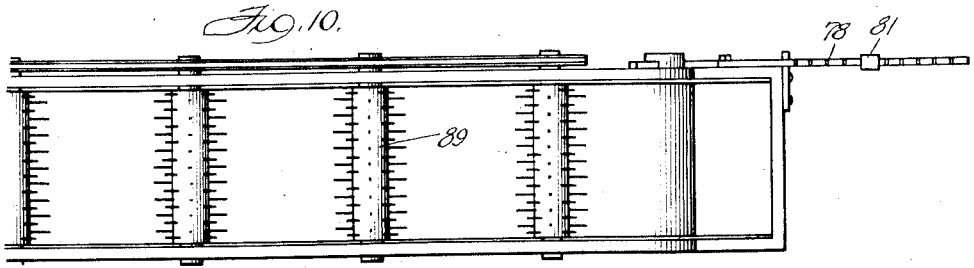
Inventor:
FREDERICK C. KRUEGER
By Edwin B. H. Tower, Jr. Atty.

Patented June 10, 1930

1,762,443

UNITED STATES PATENT OFFICE

FREDERICK C. KRUEGER, OF NEW LONDON, WISCONSIN, ASSIGNOR, BY MESNE ASSIGNMENTS, TO HENRY E. HAMILTON

CANNING MACHINE

Application filed September 20, 1924. Serial No. 738,849.

This invention relates to a canning machine.

An object of the invention is to produce an improved canning machine.

Another object of the invention is to provide a canning machine which will efficiently can stringy material.

Another object is to provide a machine which will automatically deliver a predetermined amount of material to each can.

It is difficult to deliver a predetermined quantity of kraut or like shredded or stringy material to a can for the reason that the bulk of the kraut at any given time is no indication of the actual quantity of material present. The quantity can be determined accurately only by weight although a volume measure of material is reasonably sufficient if the material is pre-treated by combing or otherwise to arrange its fibres or shreds in substantial uniformity. It is a purpose of this invention therefore to subject stringy material to a first operation which disposes the strings or shreds with substantial uniformity upon a conveyer, to subject the pre-arranged material to a measuring operation which is effected primarily by the weight of the material delivered to the measuring device but which may be effected mechanically in accordance with the volume of the material in the event that, due to the unusual difficulties encountered in the handling of stringy material, the weighing device fails to operate, and finally to compact the loosely matted material and deliver it while compacted into the receptacle in which it is to be canned.

Another object is to provide a canning machine to which material may be delivered in bulk without clogging the mechanism.

Another object is to provide a canning machine in which the cans will be automatically fed to a filling position and there filled with a predetermined amount of material.

Another object is to produce a canning machine which will be simple and compact in construction.

Another object is to produce a canning machine in which the amount of material fed to each can may be accurately regulated.

The invention contemplates a canning machine having measuring means for determining the amount of material supplied to a can, automatic means for supplying material to said measuring means, and automatic means for supplying cans intermittently to said measuring means.

An embodiment of the invention is illustrated in the accompanying drawings, in which:

Fig. 5 is a longitudinal vertical sectional view of the conveyer and hopper,

Fig. 6 is a plan view of the conveyer,

Fig. 7 is a detail perspective of the feed plunger,

Fig. 8 is a detail perspective of the hopper measuring device,

Fig. 9 is a longitudinal vertical section of a modified form of conveyer, and

Fig. 10 is a plan view of the conveyer shown by Fig. 9.

The machine, in general, comprises a can support or turn table, a compressing and filling means, a can feeding means, and a material feeding and measuring means.

The can support or turn table is adapted to receive and move around in succession a number of cans.

The turn table or support, due to the intermittent rotary movement, successively carries each can beneath the food discharge opening.

The cans are halted in their forward progress by this intermittent motion of the table a sufficient time to enable them to be filled with the kraut or other material, after which they are moved forward to a discharge pipe where they receive brine sufficient to complete their filling.

The cans are then discharged to another machine for capping.

The feeding, measuring, compressing and filling means of the machine comprise a conveyer, a hopper, a measuring device within the hopper, a compressor slide or feed plunger, and a discharge or actuating plunger.

The material is carried by means of the conveyer into the receiver hopper and measuring device, after which the compressor slide, in its forward movement along the slideway arranged in a chamber or receptacle at the base of the hopper, compresses and carries before it a quantity of such material.

When this feed plunger has reached the limit of its forward movement, the forward end of the plunger and the end of the receptacle constitute a packing chamber through which the discharging plunger may reciprocate and in which the movement of the feed plunger has compressed the material in a suitable form for being discharged into the can.

It should be understood that the speed of the movement of the turn table and the reciprocatory movement of the slide and plunger are so timed that each occurs in proper sequence.

The means by which this synchronization is accomplished will later be explained in detail.

The specific description of the machine, the functional movement of which has been broadly outlined above, follows:

Can support or turn table

Figure 1:
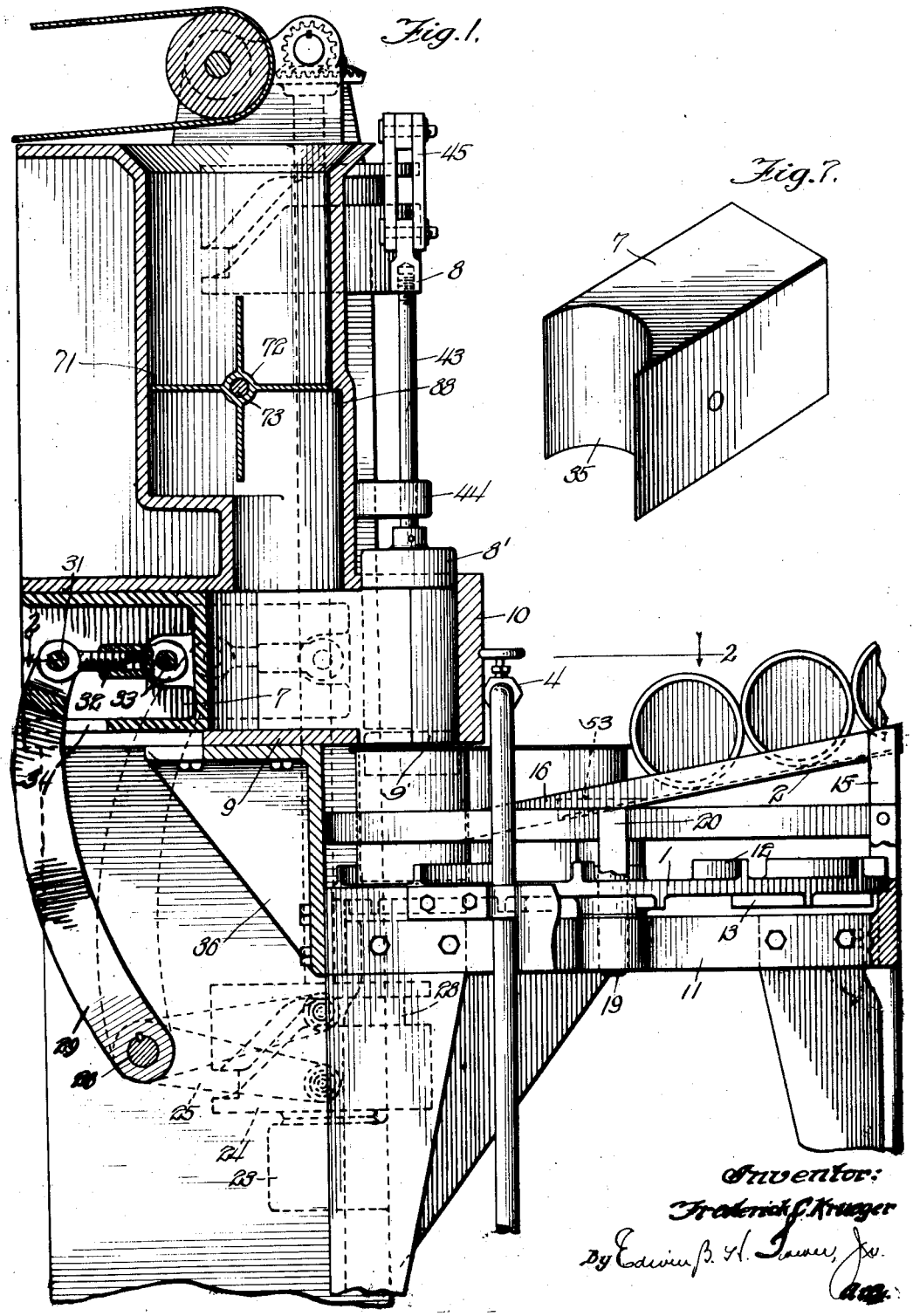
Fig. 1 is a side elevation shown partly in section.
Figure 2:
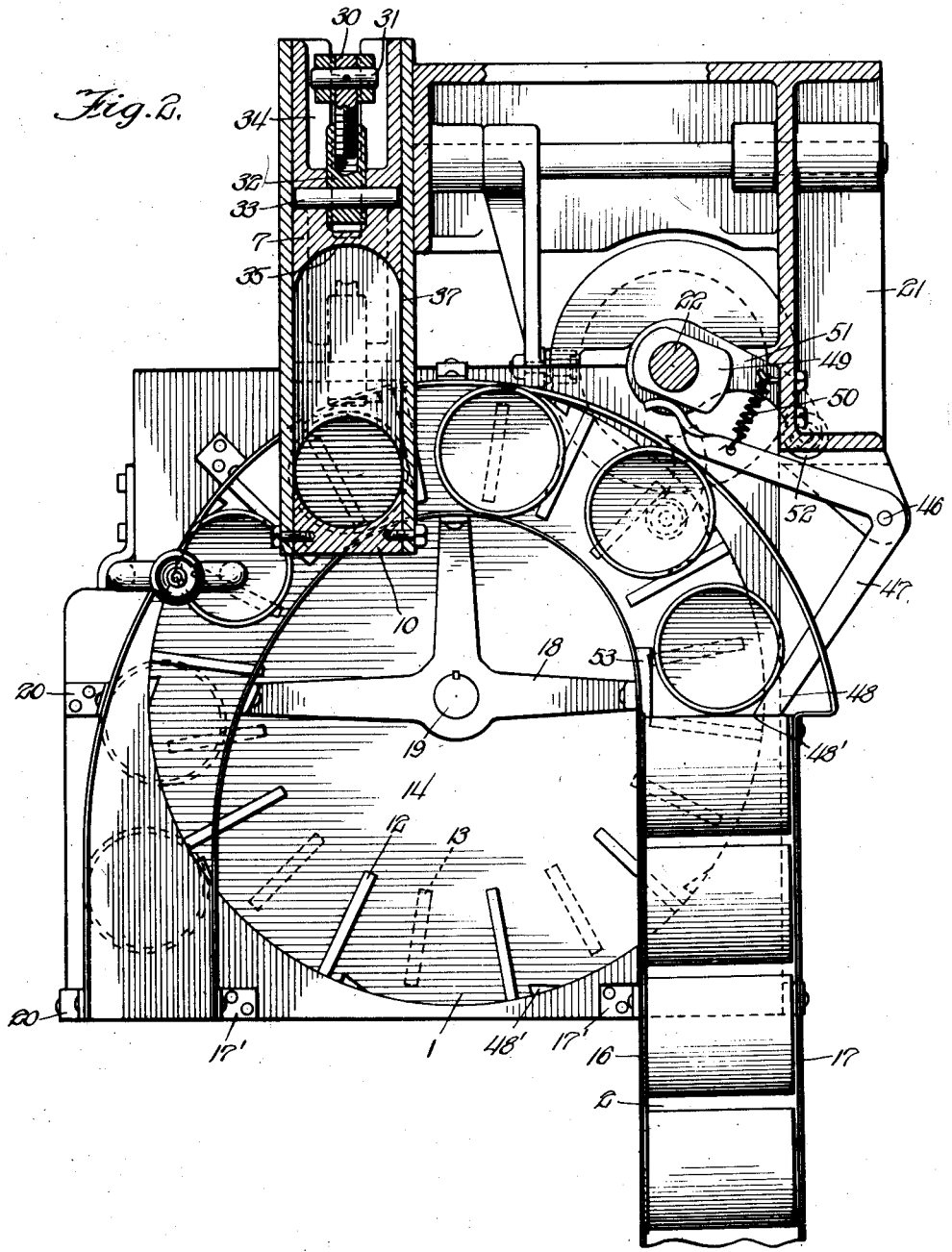
Fig. 2 is a plan sectional view taken on line 2—2 of Fig. 1.
Figure 3:
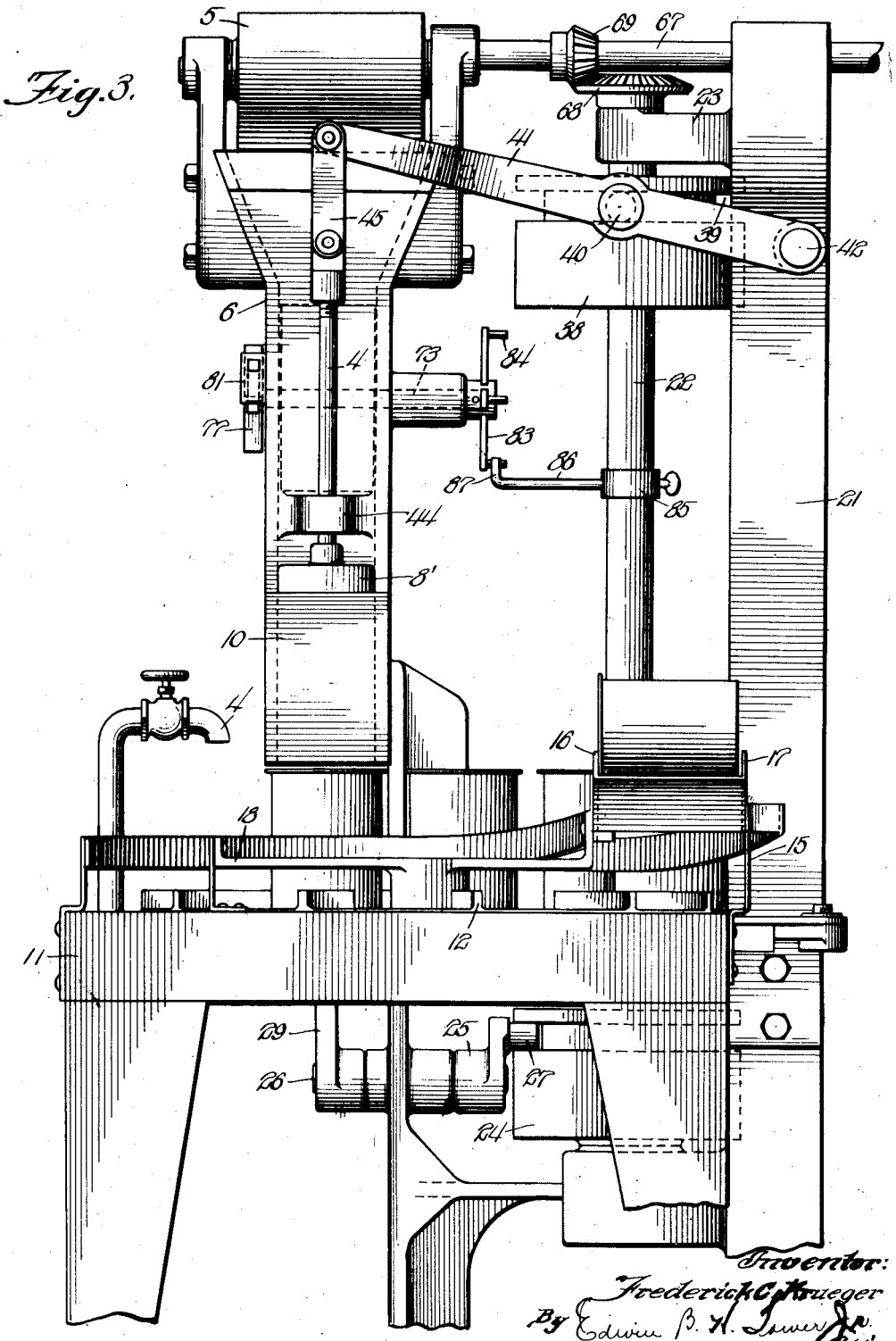
Fig. 3 is a front elevation.
Figure 4:
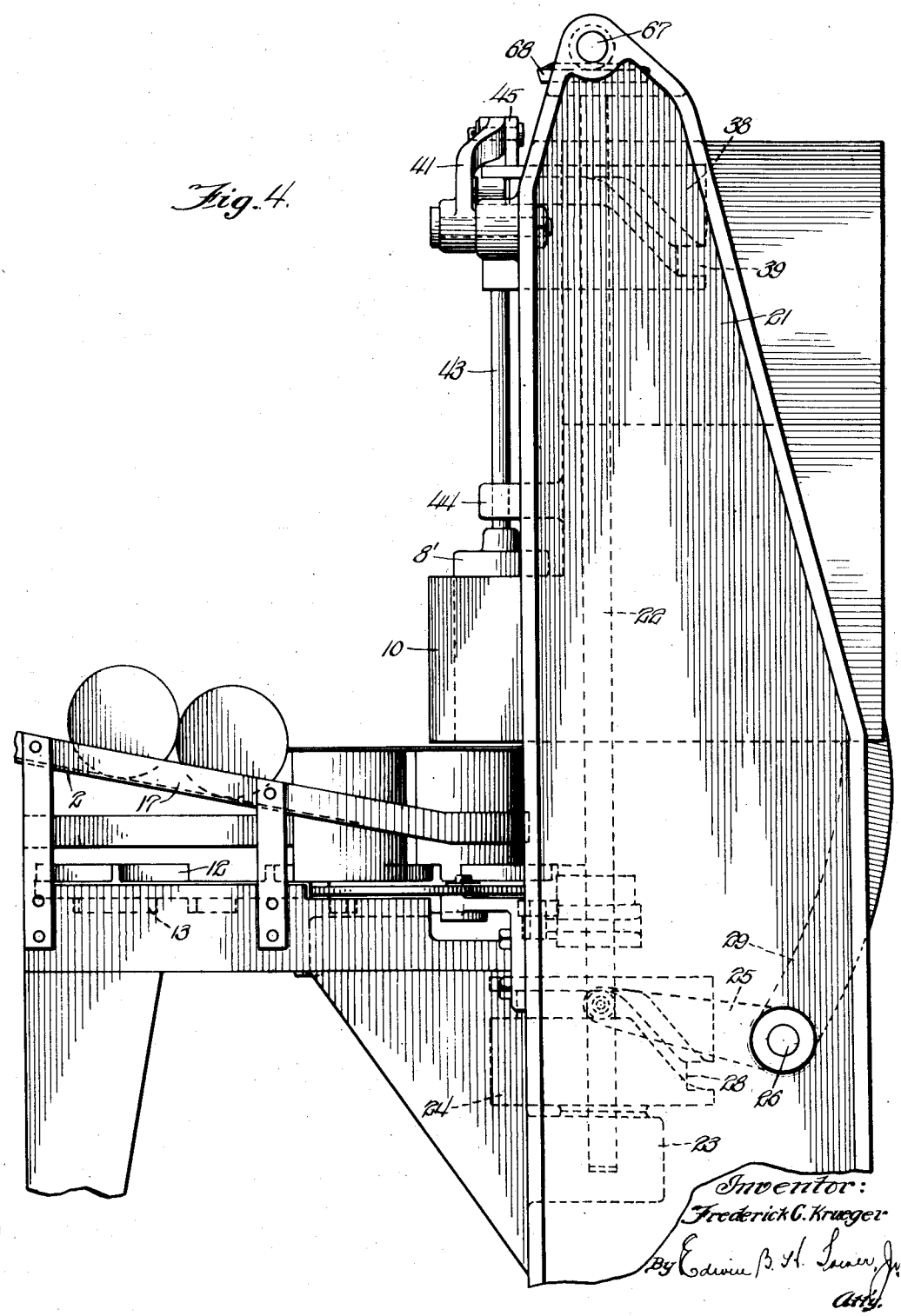
Fig. 4 is a side elevation.

The can support or turn table 1 is shown rotatably mounted upon a suitable supporting frame 11. The table 1 is provided with upper and lower sets of ribs 12 and 13, respectively, extending radially from the center thereof, as best shown in Figs. 1 and 2. The supporting frame 11 is provided with an annular recess in which the table 1 loosely fits for rotation.

A track or guide 2 is supported in angular relation to the frame by upright brackets 15. This track or guide, being provided with side rails or bands 16 and 17, furnishes means by which the empty cans may be fed to the machine. It will be obvious that the cans will roll down by gravity upon the table when placed in the guide. The guide 16 is supported upon the frame by a spider 18 fitted to shaft 19 and by the additional bracket 17' secured to frame 11. The guide 17 is secured to the frame by brackets 20.

Compressing and filling means

On the right hand side of the supporting frame 11 is bolted or otherwise secured a standard or vertical frame work 21. A driving shaft 22 is journaled in brackets 23 integral with the standard 21. A cam 24 is fixed to the lower end of the shaft 22 to oscillate an arm 25 fixed to a shaft 26 journaled in the base of standard 21. This oscillation is occasioned by a roller 27 mounted on the end of the arm 25 engaging the cam slot 28 in the cam 24. An arm 29 is secured to shaft 26 for movement with arm 25. The upper end of arm 29 is bifurcated to receive an eye-bolt 30. A pin 31 pivotally connects eye-bolt 30 and arm 29. The bolt 30 is threaded into a bolt 32 pivotally connected to a slide 7 by means of a pin 33, as shown in Fig. 2.

The slide 7 is hollow and is provided with a slot 34, within which lever 29 moves. The forward end of slide 7 is formed with a semi-cylindrical concave surface 35, the function of which will be hereinafter explained.

An L-shaped bracket 36 is fixedly secured to frame 11. A hopper 6 is supported by this bracket 36. The bottom 9, sides 37 and end 10 of this hopper form a guideway for slide 7 and for a plunger 8, later to be described. The end 10 of the sideway or guide is formed with a semi-cylindrical concave face complementary to the similarly formed end of the slide 7. The bottom 9 of the slideway is provided with a discharge opening or vent 9', said opening or vent lying in the path of the plunger, above referred to. The function of these two complementary surfaces will be clearly understood from a description to follow later.

Material such as kraut falls from the measuring device 70 onto the plate 9.

The slide 7 moves forwardly compressing this material against the curved wall 10.

When the movement of the slide 7 is completed outwardly, the plunger 8' is forced down pressing the compressed material into the can immediately underneath the space between the wall 10 and the outer end of the slide 7 in outward position.

As soon as the plunger 8' finishes its downward stroke it is returned upwardly to the full line position in Fig. 1.

As soon as the plunger 8' is free of the last can on the turn table 1, the table is turned one step presenting the next can in the series for filling.

When the next can is in position for filling, the slide 7 is then moved back to the full line position in Fig. 1.

Any material which has dropped on the top of the slide 7 is scraped off by the partition in the lower end of the hopper and falls onto the plate 9.

The slide 7 is held in outward position to close the bottom of the hopper so that no material will pass until a can is in position to receive the same.

Secured to the upper end of the shaft 22 is a cam 38 similar to cam 24. The cam 38 is provided with a slot 39 to receive a roller 40, which is mounted on a lever 41. This lever is pivotally connected to the standard 21 at 42.

A vertically reciprocating plunger 8 is shown mounted on the front of the hopper 6. This plunger comprises a plunger head proper 8' carried by a rod 43. The rod 43 is guided in its reciprocating movements by a bracket 44 mounted on the hopper 6. Links 45 are pivotally connected to the upper end of the rod 43 and the lever 41.

It will thus be obvious that as the shaft 22 rotates, the lever arm 41, due to the cam slot 39 and the roller 40, will rock about its pivot. This movement, translated to the rod 43 by means of the pivotally connected links 45, will cause the plunger to reciprocate vertically in its guide 44.

By the rotation of shaft 22, the horizontally reciprocating slide 7 has previously been moved. This action is caused by the movement of the roller 27 in the cam slot 28 of the cam 24 imparting an oscillatory movement to arms 25 and 29.

It will now be well to briefly describe the results obtained by these movements.

A quantity of the kraut or other material being upon the base or bottom of the slideway is carried toward the end 10 by the concave end 35 of the slide 7. When the slide has reached the limit of its forward movement, the material is compressed between the complementary concave surfaces of the slide 7 and the end 10. The material thus compressed is then ejected by the downward movement of the plunger 8' into a can which has been brought into proper position by the intermittent motion of the turn table 1.

The two complementary concave surfaces, above referred to, form a complete cylinder, slightly less in diameter than the inside diameter of the can to be filled, and thus form the material into a mass of suitable shape and size to readily enter the can.

*Means for intermittently rotating turn table*

The intermittent rotary motion of the turn table by which the cans are brought into the proper position for filling will now be explained.

Pivoted to the frame 21 at 46 is a bell crank 47, adapted to move in the plane of table 1. One end 48 of bell crank 47 is adapted to engage recesses 48' on the edge of table 1 to prevent rotation thereof as hereinafter explained. The other end of member 47 is formed to cooperate with a cam 49 fastened to shaft 22. A spring 50 connected to standard 21 and member 47 holds this end in engagement with the cam 49, as shown in Fig. 2. An arm 51, carrying a roller 52 arranged in the plane of ribs 13 on the bottom of the table 1, is fixed to shaft 22 for rotation therewith.

The shaft 22, revolving continuously, carries arm 51 with it. When the roller 52 engages one of the ribs 13, as shown in dotted lines in Fig. 2, the turn table 1 is rotated one space. Just before the roller 52 comes in contact with the rib 13, the cam 49, which is rigidly mounted on shaft 22, comes in contact with the curved surface of the bell crank 47, thereby raising the end 48 out of the notch 48' in the turn table 1. The table is then free to be advanced by the roller 52. Just before the table completes this movement, the cam 49 releases, and the spring 50 pulls the end 48 against the periphery of the turn table 1 and it engages the next notch 48'. This movement, of course, is repeated each time the table is advanced.

*Can feeding means*

It should be observed here that the cans are fed to the machine by being placed on their sides in the inclined guideway 2. Located at the base of the guideway 2 is an inclined ledge 53. This ledge engages the flanged end of the horizontally positioned cans as they pass from the guide onto the table 1, and causes them to tip into an upright position. The cans are thus automatically arranged in an upright position on the turn table, although originally having been fed to the machine on their sides. The ribs 12 of the table 1, being properly arranged, carry the cans, in their upright position, along with the turn table and thus place them in position to be filled. This filling operation being timed so that it is completed between each rotary movement of the table, it will be seen that each can is advanced to, detained under, and moved away from the filling position in proper sequence.

After the cans have been filled with the kraut or other material, the next step carries them beneath a discharge pipe 4, where a charge of brine completes their filling. They are then carried to another machine to be capped.

*Material feeding and measuring means*

The material feeding means will next be described in detail.

A hopper 54, provided at the bottom thereof with a belt conveyer 5 mounted on a roller 55 journaled at one end thereof, and a roller journaled at the top of hopper 54, receives the material. A square shaft 57, provided with a plurality of prongs 58, is journaled between the sides of the hopper, as shown in Fig. 6. An arm 59, provided with a lug 60, is fixed to one end of shaft 57. The lug 60 is adapted to engage the notches in a segment 61, secured to one side of the hopper. Thus, due to the arrangement of the lug and segment, a variable adjustment of the distance between prongs 58 and the conveyer belt 5 may be obtained.

A sleeve 62 is supported on an eccentric 63 journaled between the sides of the hopper and is driven by a chain 63' which may be driven by the shaft 67. This sleeve 62 is provided with prongs 64 arranged to fit and move between prongs 58. A rod 65 passes through slots 66 in the ends of arms 67' formed integral with sleeve 62 to hold the latter against rotation with eccentric 63.

It will thus be observed that the quantity of material to be fed to the conveyer belt may be easily regulated. If a greater or lesser amount of material is to be admitted, the arm 59 is moved in the desired direction and the lug 60 is engaged with a notch of segment 61. Thus the distance between the prongs 58 and the belt is varied as desired. The fingers 64 are moved upward and then to the left downward between the prongs 58 into the material and then backward through the prongs 58, thereby pulling through a certain amount each time. Of course, it will be understood how this movement of the fingers 64 is actuated by the revolutions of the eccentric shaft 63. It will also be observed that the entire device is guided in this movement by the slots 66 in the arms 67 and the pin 65.

The belt conveyer 5 is driven by a shaft 67 supported in suitable bearings on the standard 21 and hopper 6. The shaft 67 has a gear 69 mounted thereon which meshes with a gear 68 attached to the upper end of shaft 22 and is driven thereby.

The kraut or other material is dumped by the conveyer belt into the hopper 6. Rotatably mounted within the hopper 6 is a measuring device 70. The measuring device comprises four radially extending plates 71 carried by a central hub portion 72. The hub portion 72 is mounted upon the shaft 73 and is rotatable therewith.

Upon the opposite ends of the shaft 73 are located the trip mechanisms 74 and 75. The weight trip mechanism 74 comprises a central hub portion 76 mounted upon the shaft 73 for rotation therewith.

Projecting perpendicularly from the central portion are arms 77. The pivoted lever 78 having a downwardly projecting offset arm 79 is arranged for cooperation with the arms 77. The lower end of the arm 79 is provided with an inclined portion 80 which engages the under edge of the blades 77.

Upon the other arm of the lever 78 a weight 81 is arranged for slidable adjustment therealong.

The force trip mechanism 75 comprises a central hub portion 82 mounted upon the shaft 73 for rotation therewith. Projecting from this hub portion are four arms 83. Near the outer extremity of each arm a pin 84, projecting at right angles to the plane of the arm, is secured.

A collar 85 is adjustably positioned upon the shaft 22. Extending from this collar is an arm 86 having an upwardly projecting offset portion 87. The offset portion 87 is adapted to strike against the pins 84.

The shaft 73 is rotatably supported transversely of the hopper 6 by bearings formed in the opposite walls of the said hopper.

The weight trip mechanism is mounted upon the outside of one wall of the hopper while the force trip mechanism is mounted upon the outside of the other wall. The lever 78 is pivoted to the wall of the hopper.

When the measuring device is in the position shown in Fig. 1, the two blades lying in a horizontal plane are slightly less in length than the distance across the hopper. The kraut is held upon the forward plate until the device rotates.

When sufficient material has been dumped by the conveyer into the measuring device to overcome the action of the weight 81 upon the lever 78, the end of the arm 77 in engagement with the inclined surface 80 of the arm 79 will cause the lever to swing counterclockwise about its pivot. The force trip mechanism is provided to insure the rotation of the conveying device when the desired quantity of material is placed therein.

The shaft 22, revolving continuously, carries with it the collar 85 and the arm 86. The offset end 87 of the arm 86 strikes against the pins 84 during its circular movement with the shaft 22.

This engagement of the arm 87 with the pins 84 causes the trip device 75 to rotate in a clockwise direction and thereby revolve the measuring device. This movement of the trip device 75 is arranged to occur an instant after the weight trip device 74 is placed in operation.

The measuring device 70 is held by the weighted arm 78 in position to receive material from the conveyor. The amount of material measured thereby may be regulated by the position of the weight 81 on the arm.

This device is tripped by the arm 86 rotating with the shaft 22 which arm engages one of the pins 84 on the shaft 73 carrying the members 70. The trip 86 is a positive trip operating irrespective of the amount of material on 70.

The operator will ordinarily maintain the combing teeth 58 at an elevation above the kraut conveyor such that the proper weight of material will be delivered to the measuring wheel 70 immediately prior to the mechanical 45° rotation of such wheel which periodically occurs. Due to the difficulty of measuring kraut or like stringy material by volume, as previously noted, it is preferred to ensure the delivery to the measuring device of a quantity of kraut sufficient to ensure the operation of the weight operated trip under ordinary circumstances. The stringiness of the kraut, however, also tends to impede the free movement of the wheel and the auxiliary mechanical means of operating the wheel is thereby added to ensure delivery from the wheel to the kraut carried thereon in synchronism with the operation of the remainder of the machine. It will be found that when the machine is so adjusted that the amount delivered to the measuring wheel 70 is ordinarily sufficient to trip the detent by its own weight in the interval provided, a substantially correct amount of material will be delivered mechanically during the occasional interval when the material lodges against the wall of the hopper in such a way that the weight device fails to operate and the mechanical means of operating the wheel 70 is brought into play.

It will be understood from the foregoing that the weight operated trip is primarily relied upon to release a predetermined amount of material, measured by weight, into the compacting mechanism but that in the event that the weight of the material is insufficient to operate the wheel, due to lodging or some other circumstance peculiar to the stringy substances handled by the machine, the mechanical operation of the wheel is then effected and, because of the adjustment of the delivery of material in conformity with previous measurement thereof by weight, a substantially like quantity of material will be found to be delivered during the interval of mechanical operation.

The hopper 6 is cut away at 88 so that the kraut will be free to fall into the receiving chamber when the measuring device rotates.

The conveyer shown in Figs. 9 and 10 has rollers 89 mounted adjacent the upper surface thereof which are operatively connected to the chain 63'. These rollers are provided with teeth 90.

When the machine is in operation, the rollers 89 are continuously revolving in a direction opposite to the movement of the conveyer, and the teeth 90 comb the material into straight lengths as it passes along the conveyer belt.

The rollers also serve to assist the conveyer belt in bringing the material to the hopper.

The invention is, of course, susceptible of various modifications and adaptations.

What I claim is:

1. In a canning machine, means for introducing the material into the machine, said means comprising a conveyor belt, a series of prongs or teeth spaced from said belt, and a second series of prongs or teeth movable between said first named series, said two series of prongs or teeth adapted to restrict and to draw through upon the conveyor belt a desired quantity of material.

2. In a device of the character described, the combination with a conveyor of a set of teeth in spaced relation thereto and a second set of teeth intermeshing with the first set and oscillatable to and from the surface of the conveyor between the teeth of the first set in an arc adapted to force toward the conveyor material held by the first set of teeth and adapted also to move toward a position of retraction from said first set of teeth, whereby to draw beneath said first set of teeth upon said conveyor a substantially constant depth of material, and means connecting said conveyor and second set of teeth for simultaneous operation.

3. In a device of the character described, the combination with a hopper for material to be conveyed, and a conveyor moving across an open portion of said hopper, of means restricting material in said hopper from moving with the conveyor, said means comprising a set of elongated teeth spaced from said conveyor.

4. In a device of the character described, the combination with a hopper for material to be conveyed, and a conveyor moving across an open portion of said hopper, of means restricting material in said hopper from moving with the conveyor, said means comprising a set of elongated teeth spaced from said conveyor, together with a device for adjustably feeding material beneath said teeth in a substantially even layer upon the conveyor, said device comprising a second set of teeth intermeshed with said first set and mounted for movement therebetween to and from the surface of said conveyor, whereby to be adapted to draw beneath and through said first set of teeth material held in check thereby.

5. In a device of the character described, the combination with a hopper for material to be conveyed, and a conveyor moving across an open portion of said hopper, of means restricting material in said hopper from moving with the conveyor, said means comprising a set of elongated teeth spaced from said conveyor, together with a device for adjustably feeding material beneath said teeth in a substantially even layer upon the conveyor, said device comprising a second set of teeth intermeshed with said first set and mounted for movement therebetween to and from the surface of said conveyor, whereby to be adapted to draw beneath and through said first set of teeth material held in check thereby, said second teeth being oscillatory and operatively connected for movement simultaneously with the movement of said conveyor.

6. In a device of the character described, the combination with a hopper for material to be conveyed, and a conveyor moving across an open portion of said hopper, of means restricting material in said hopper from moving with the conveyor, said means comprising a set of elongated teeth spaced from said conveyor, together with a device for adjustably feeding material beneath said teeth in a substantially even layer upon the conveyor, said device comprising a second set of teeth intermeshed with said first set and mounted for movement therebetween to and from the surface of said conveyor, whereby to be adapted to draw beneath and through said first set of teeth material held in check thereby, said second teeth being oscillatory and operatively connected for movement simultaneously with the movement of said conveyor in an arc such that said second teeth tend to withdraw from the first teeth in approaching said conveyor.

7. In a device of the character described, the combination with a conveyor and walls laterally confining material thereon for delivery in a layer of predetermined thickness on the conveyor, of means adjustably spaced from the conveyor and adapted to restrict the movement with the conveyor of material supported thereon, and a combing device associated with said adjustably spaced restricting means and mechanically connected with the conveyor for movement during conveyor operation in a direction tending to thrust material beneath said means.

8. In a device of the character described, the combination with a conveyor, and walls laterally confining material thereon for delivery in a layer of predetermined thickness on the conveyor, of means adjustably spaced from the conveyor and adapted to restrict the movement with the conveyor of material supported thereon, and a combing device associated with said adjustably spaced restricting means and mechanically connected with the conveyor for movement during conveyor operation in a direction tending to thrust material beneath said means, said combing device comprising teeth operable through openings in said means.

9. In a device of the character described, the combination with a conveyor and means for confining material to be supported upon a portion of said conveyor for delivery in a thin layer thereon, of a first set of teeth having a general inclination toward said conveyor in the direction of conveyor movement, means for adjusting said first set of teeth as to the spacing of the teeth from the conveyor and a second set of teeth intermeshing with the first set and movable in a direction to draw material from behind the first set of teeth through and beneath said first set of teeth onto the conveyor in a substantially uniform layer.

10. In a device of the character described, the combination with a conveyor and means for confining material to be supported upon a portion of said conveyor for delivery in a thin layer thereon, of a first set of teeth having a general inclination toward said conveyor in the direction of conveyor movement, means for adjusting said first set of teeth as to the spacing of the teeth from the conveyor and a second set of teeth intermeshing with the first set and movable in a direction to draw material from behind the first set of teeth through and beneath said first set of teeth onto the conveyor in a substantially uniform layer, said second set of teeth being operatively connected for movement simultaneously with said conveyor.

11. In a canning machine, the combination with adjustable means for feeding stringy material at a substantially constant rate, of a device adapted normally for measurement of such material by weight, and means for compacting and delivering to a can the material so measured, said device including a means for mechanically actuating the measuring device in the event that the weight operation thereof is ineffective.

12. In a device for canning stringy material, the combination with means for feeding such material at a substantially constant rate, of a measuring device disposed in the path of such material and adapted to permit material to collect thereon for mass delivery, a detent normally supporting said device against delivery and adapted to be released by the weight of material upon said device, and means for periodically effecting delivery from said device mechanically after an interval in which the weight of material thereon is ineffective for such delivery.

13. In a canning machine, a measuring device comprising a rotary part to which material to be measured is delivered in a position tending to rotate such part by its weight, a detent restraining said part against rotation and adapted normally to be tripped by the weight of material accumulating upon said part, and means for mechanically effecting the rotation of said part for delivery of the material thereon after an interval in which the weight of such material is ineffective for the rotation thereof.

14. In a device of the character described, the combination with a conveyor, of a combing means associated therewith and adapted to reduce material supported on said conveyor to a layer of substantially uniform thickness and compactness, a hopper into which said conveyor discharges, a rotary valve in said hopper adapted to receive said material and normally to be rotated by the weight thereof, a detent for said valve normally securing it against rotation and releasable when the weight of material on said valve reaches a predetermined value, and means for the mechanical operation of said valve after a predetermined interval normally sufficient for material delivered onto said valve to reach the predetermined weight required for the release of said detent and the operation of the valve.

15. In a device of the character described, the combination with a conveyor, of a combing means associated therewith and adapted to reduce material supported on said conveyor to a layer of substantially uniform thickness and compactness, a hopper into which said conveyor discharges, a rotary valve in said hopper adapted to receive said material and normally to be rotated by the weight thereof, a detent for said valve normally securing it against rotation and releasable when the weight of material on said valve reaches a predetermined value, and means for the mechanical operation of said valve after a predetermined interval normally sufficient for material delivered onto said valve to reach the predetermined weight required for the release of said detent and the operation of the valve, together with means for compacting and delivering to cans the successive quantities of material discharged from said valve.

16. In a device of the character described, the combination with a hopper provided with a rotary valve and means for delivering material upon said valve at one side of the axis thereof, of a detent means for resisting rotation of said valve up to a predetermined weight of material delivered thereto, and means for mechanically rotating said valve at predetermined intervals with force sufficient to overcome the resistance of said detent.

17. The combination with means for delivering at a substantially constant rate material subject to becoming lodged in a measuring device, of a rotary valve, means for guiding the material so delivered onto said valve in a position tending to produce rotation thereof, adjustable means for opposing rotation of said valve with a force proportioned to a predetermined weight of material thereon, and means for mechanically rotating said valve at intervals sufficient for the delivery of the required weight of materials thereto, whereby said valve may be operated to discharge material even when the lodging of such material prevents the weight thereof from operating the valve.

18. In a device of the character described, the combination with a hopper and a rotary valve therein provided with a shaft projecting from the hopper, of a weight operated detent normally restraining movement of said valve and yieldable to permit rotation thereof when said valve has received a sufficient weight of material in said hopper, and means periodically acting upon the shaft of said valve for the mechanical rotation thereof despite said detent at intervals calculated to permit of the accumulation of the required weight of material on the valve.

19. In a device of the character described, the combination with a hopper and a rotary valve therein provided with a shaft projecting from the hopper, of a weight operated detent normally restraining movement of said valve and yieldable to permit rotation thereof when said valve has received a sufficient weight of material in said hopper, and means periodically acting upon the shaft of said valve for the mechanical rotation thereof despite said detent at intervals calculated to permit of the accumulation of the required weight of material on the valve, said means comprising a pin projecting from the shaft of the valve and a continuously rotatable pin adapted intermittently to strike the pin projecting from the shaft.

In witness whereof, I have hereunto subscribed my name.

FREDERICK C. KRUEGER.